(12) United States Patent
Hall

(10) Patent No.: US 11,164,279 B2
(45) Date of Patent: Nov. 2, 2021

(54) SYSTEMS AND METHODS FOR AUTHENTICATING IMAGE DATA

(71) Applicant: SEMICONDUCTOR COMPONENTS INDUSTRIES, LLC, Phoenix, AZ (US)

(72) Inventor: Peter Michael Hall, Fetcham (GB)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 48 days.

(21) Appl. No.: 16/832,228

(22) Filed: Mar. 27, 2020

(65) Prior Publication Data

US 2021/0090202 A1    Mar. 25, 2021

Related U.S. Application Data

(60) Provisional application No. 62/902,677, filed on Sep. 19, 2019.

(51) Int. Cl.
   *G06T 1/00*     (2006.01)
   *H04N 1/32*    (2006.01)

(52) U.S. Cl.
   CPC .......... *G06T 1/0021* (2013.01); *G06T 1/0064* (2013.01); *H04N 1/32229* (2013.01); *H04N 1/32272* (2013.01)

(58) Field of Classification Search
   CPC . G06T 1/0021; G06T 1/0064; H04N 1/32272; H04N 1/32229; H04N 1/195; H04N 2201/3233; H04N 1/32144; G06F 21/64; G06F 21/602; H04L 2209/84; H04L 9/3242; G06K 9/209; G06K 9/3233
   See application file for complete search history.

(56) References Cited

U.S. PATENT DOCUMENTS

| | | | |
|---|---|---|---|
| 2005/0114669 A1 | 5/2005 | Ho et al. | |
| 2010/0110298 A1 | 5/2010 | Knee | |
| 2012/0230536 A1 | 9/2012 | Fridrich et al. | |
| 2019/0104251 A1* | 4/2019 | Otsuki | H04L 9/3263 |

FOREIGN PATENT DOCUMENTS

CN        104036280        9/2014

* cited by examiner

*Primary Examiner* — Christopher Wait
(74) *Attorney, Agent, or Firm* — Treyz Law Group, P.C.; Tianyi He

(57) ABSTRACT

A system may include an imaging system coupled to a host subsystem. The imaging system may include an image sensor that provides image frames to the host subsystem. The image sensor may include a data authentication subsystem that appends corresponding authentication data to each of the image frames. Each set of authentication data may be generated based on a subset of the image frame data (e.g., corresponding to image data generated by pixels defined by a sparse region-of-interest within the pixel array). The host subsystem may securely provide region-of-interest parameters to the image sensor to update the sparse region-of-interest in an adaptive manner to account for factors such as computational load of the host subsystem and authentication coverage for the entire pixel array.

20 Claims, 5 Drawing Sheets

SYSTEMS AND METHODS FOR AUTHENTICATING IMAGE DATA

This application claims the benefit of and claims priority to U.S. provisional patent application No. 62/902,677, filed on Sep. 19, 2019, which is hereby incorporated by reference herein in its entirety.

BACKGROUND

This relates generally to systems and methods for authenticating image data, and more specifically, a data authentication subsystem in an imaging system for providing configurable image data authentication functionalities.

Modern electronic systems such as such as an automotive system, a video surveillance system, a cellular telephone, etc., can include an imaging system coupled to a host system for performing the general functions of the electronic system. The host system can receive images (e.g., forming a video) from the imaging system. In some applications (e.g., automotive applications, security applications, etc.), it can be crucial to the proper functioning of the electronic system to ensure the integrity of the images from the imaging system (e.g., to ensure the images have not been tampered with and are authentic).

Difficulties can arise when employing authentication and/or cryptographic operations on large amounts of image data from the imaging system. This can consume valuable and limited processing capacity of the host system. These issues are further exacerbated when the host system does not inherently include specialized authentication and cryptographic circuitry having the necessary bandwidth and/or if the host system simultaneously receives multiple sets of images from multiple corresponding image sensors in the imaging system.

It would therefore be desirable to provide improved systems and methods for authenticating image data.

DETAILED DESCRIPTION

Embodiments of the present invention relate to a data authentication subsystem and associated circuitry configured to generate authentication data for image data from a dispersed subset of pixels in a configurable region-of-interest within an image sensor pixel array. It will be recognized by one skilled in the art that the present exemplary embodiments described herein may be practiced without some or all of these specific details. In other instances, well-known operations have not been described in detail in order not to unnecessarily obscure the present embodiments.

The data authentication subsystem and associated circuitry described herein may generally be implemented as a part of a number of hardware systems. As examples, the data authentication circuitry and associated circuitry described herein may be implemented as a part of any electronic system such as a portable electronic device, a camera, a tablet computer, a desktop computer, a webcam, a cellular telephone, a video camera, a video surveillance system, an automotive system, a video gaming system, or any other electronic system that includes imaging capabilities. If desired, the data authentication circuitry and associated circuitry described herein may be implemented as a part of an electronic system that excludes imaging capabilities (e.g., a system that includes data authentication as applied to other types of data instead of image data).

Configurations in which the data authentication subsystem and associated circuitry are formed as a part of an imaging system and are used in conjunction with a host subsystem are described in detail herein as examples. However, this is merely illustrative. If desired, the data authentication subsystem and associated circuitry may be implemented in any of the above-mentioned systems or other systems.

Figure 1:
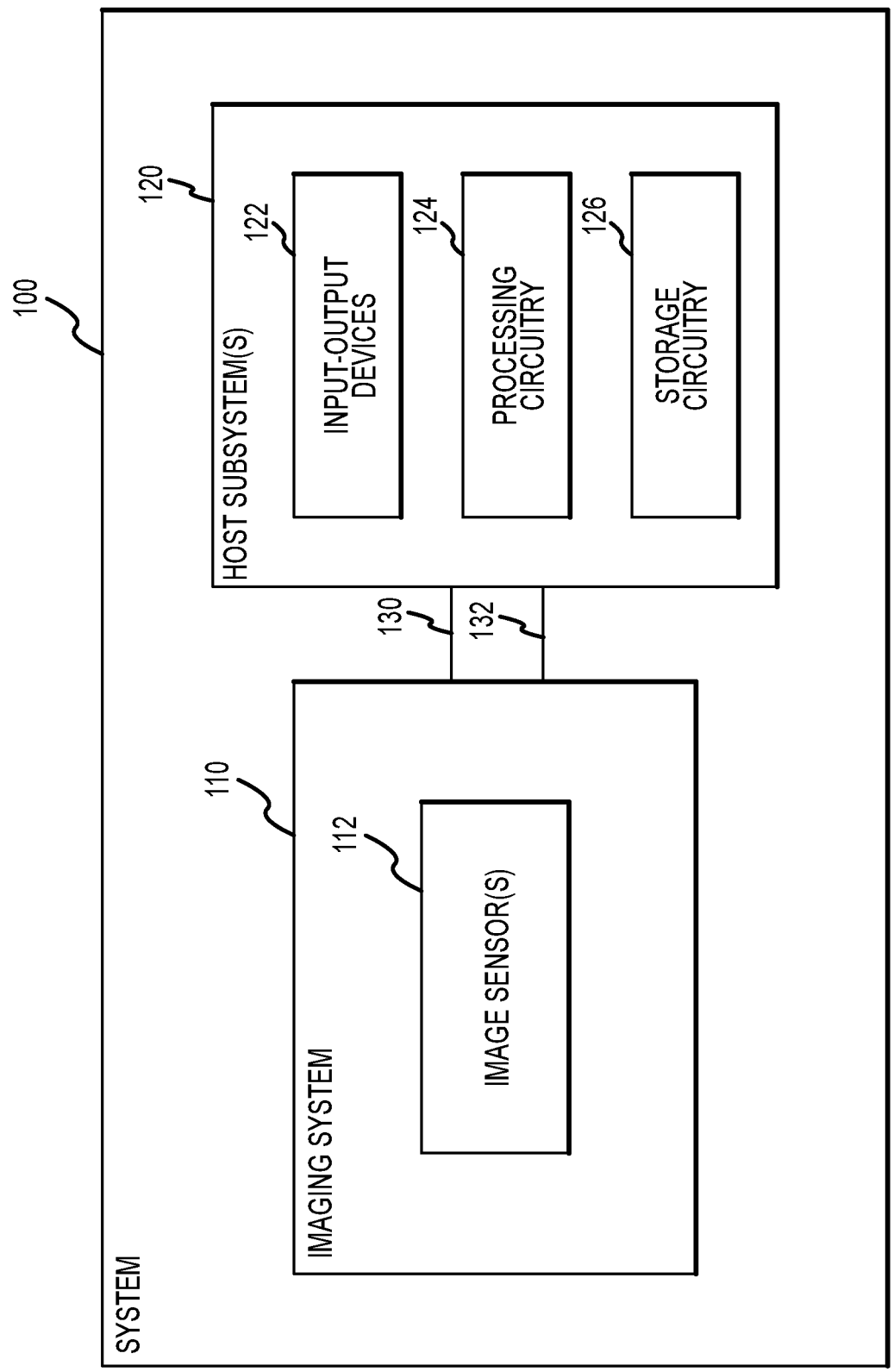
FIG. 1 is a diagram of an illustrative system having an imaging system and one or more host subsystems in accordance with some embodiments.

FIG. 1 is a diagram of an illustrative system (e.g., system 100) having an imaging system that uses one or more image sensors to capture images (e.g., image frames). System 100 of FIG. 1 may be an electronic device such as a camera, a cellular telephone, a video camera, or other electronic device that captures image data, may be a vehicle safety system (e.g., an active braking system or other vehicle safety system), automotive vision system, or other type of automotive system, may be a surveillance system, etc.

As shown in FIG. 1, system 100 may include imaging system 110 and one or more host subsystems such as host subsystem 120. Imaging system 110 may include one or more image sensors 112 and one or more corresponding lenses covering image sensors 112. Each image sensor 112 may be identical or there may be different types of image sensors 112 in a given image sensor array integrated circuit. During image capture operations, each lens may focus light onto an associated image sensor 112.

Imaging system 110 may convey image data (e.g., a series of (image) frames, still image data, video image data, etc.) generated by one or more image sensors 112 to host subsystem 120 over one or more (image data) paths 130. As examples, paths 130 may be implemented using a parallel data bus, one or more MIPI (Mobile Industry Processor Interface) channels, or any other suitable data paths. If desired, path 130 may be implemented with coaxial or twisted-pair cables with serializer/deserializer chipsets.

Host subsystem 120 may include software instructions for processing the received image data such as detecting objects in images, detecting motion of objects between image frames, determining distances to objects in images, filtering or otherwise processing images provided by imaging system 110.

If desired, system 100 may provide a user with numerous high-level functions. In an automotive system or advanced cellular telephone, as examples, a user may be provided with the ability to run user applications or other applications. To implement these functions, host subsystem 120 may include input-output devices 122 such as keypads, input-output ports, joysticks, and displays, processing circuitry 124, and memory circuitry 126 (e.g., data storage circuitry). Memory circuitry 126 may include volatile and nonvolatile memory (e.g., random-access memory, flash memory, hard drives, solid-state drives, read-only memory, etc.). Processing circuitry 124 may include microprocessors, microcontrollers, digital signal processors, application specific integrated circuits, secure processors, etc. As an example, processing circuitry 124 may process software instructions stored at memory circuitry 126 (e.g., firmware instructions or software instructions for running user applications, for image data processing applications, for object detection applications, or for other applications, etc.).

In some embodiments, host subsystem 120 may be an automotive electronic control unit. Host subsystem 120 may provide control and/or data signals (e.g., commands, parameters, etc.) for operating imaging system 110 over one or more (control) paths 132. Paths 132 may be implemented using an I2C (inter-integrated circuit) bus. In particular, processing circuitry 124 may process software instructions stored at memory circuitry 126 for configuring and/or controlling imaging system 110 (e.g., image sensor 112) and for authenticating image data received from imaging system 110.

Figure 2:
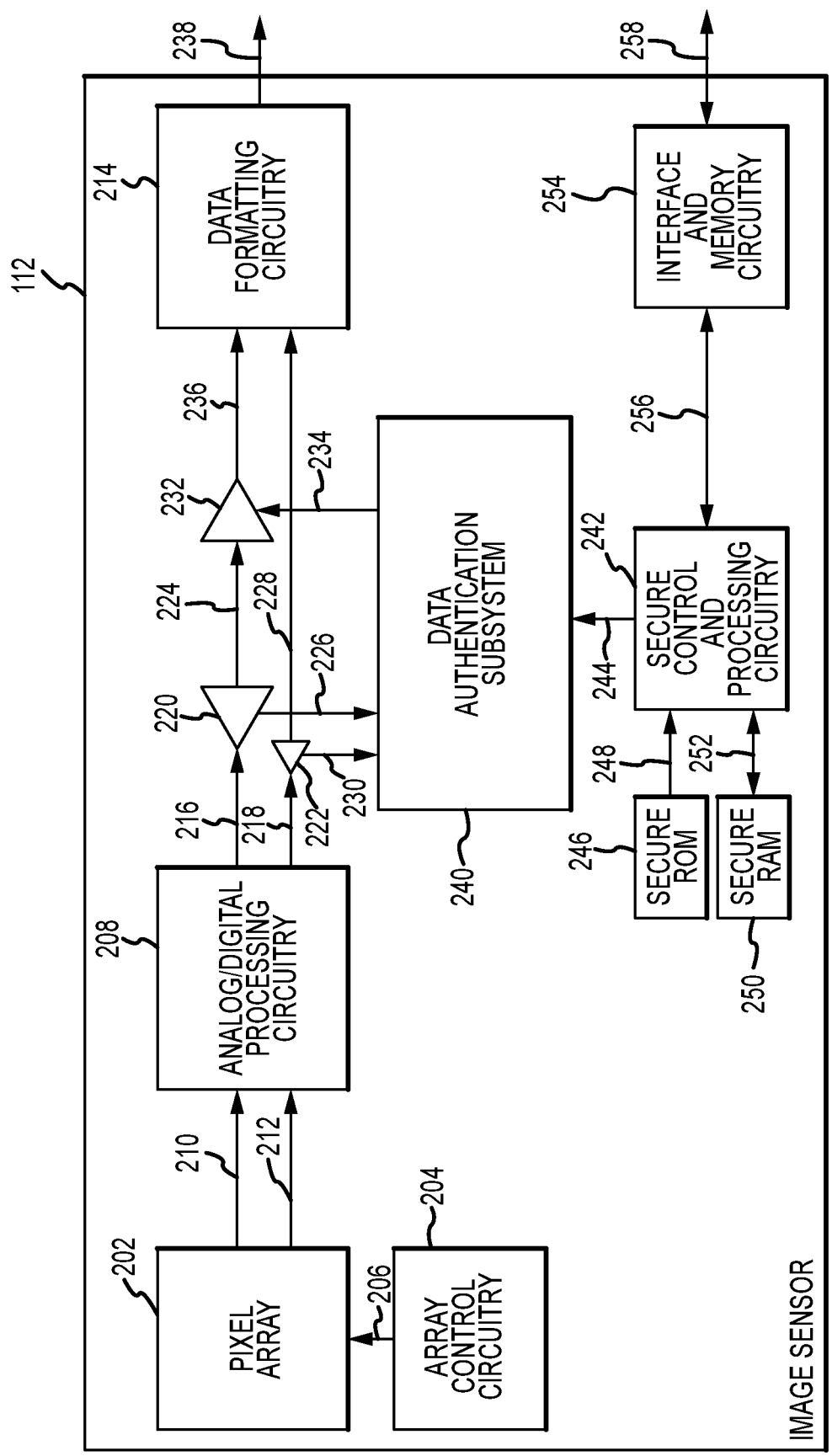
FIG. 2 is a diagram of an illustrative image sensor for generating image data and having a data authentication subsystem in accordance with some embodiments.

An illustrative arrangement for image sensor 112 of FIG. 1 is shown in FIG. 2. As shown in FIG. 2, image sensor 112 may include an image sensor pixel array such as image sensor pixel array 202. Image sensor pixel array 202 may include image sensor pixels (sometimes referred to herein as pixels or image pixels) arranged in columns and rows.

Pixel array 202 may be provided with a color filter array having multiple color filter elements, which allows a single image sensor to sample light of different colors. As an example, image sensor pixels in pixel array 202 may be provided with a color filter array that allows a single image sensor to sample red, green, and blue (RGB) light using corresponding red, green, and blue image sensor pixels arranged in a Bayer mosaic pattern. In another suitable example, the green pixels in a Bayer pattern may be replaced by broadband image pixels having broadband color filter elements (e.g., clear color filter elements, yellow color filter elements, etc.). These examples are merely illustrative and, in general, filter elements of any desired color or wavelength and in any desired pattern may be formed over any desired number of the image pixels in array 202. If desired, one or more color filter elements may be omitted.

One or more lenses may be formed over pixel array 202. As an example, a microlens may be formed over each pixel in pixel array 202 to focus light onto the corresponding pixel (e.g., a microlens array may be formed over pixel array 202). As another example, one or more macro-lens structures may be disposed over pixel array 202 to direct light onto pixel array 202.

Pixel array 202 may have any suitable number of rows and columns of pixels. In general, the size of pixel array 202 and the number of rows and columns of pixels in array 202 will depend on the particular implementation of image sensor 112. While rows and columns are generally described herein as being horizontal and vertical, respectively, rows and columns may refer to any grid-like structure (e.g., features described herein as rows may be arranged along a first direction and features described herein as columns may be arranged along a second direction that is non-parallel to the first direction).

Image sensor 112 may include array control circuitry 204 configured to provide control signals to pixels in image sensor pixel array 202 via one or more control paths 206. As an example, array control circuitry 204 may include row control circuitry coupled to rows of image sensor pixels and configured to supply row control signals via rows lines. If desired, array control circuitry 204 may also include column control circuitry (e.g., configured to selectively provide bias signals or other signals along column lines to one or more columns of pixels).

Image sensor 112 may include analog and/or digital processing circuitry 208 configured to receive image signals from image sensor pixel array 202 via one or more paths 210. In particular, processing circuitry 208 may perform processing operations on the received image signals. Processing circuitry 208 may also receive timing data (e.g., image frame timing data) associated with the image signals via one or more paths 212 and may process the image signals based on the timing data. As examples, the timing data may be indicative of beginnings and ends of image data for each image frame, for each image frame row, for any suitable section of image data, etc.

As an example, processing circuitry 208 may include column readout circuitry coupled to columns of image sensor pixels and configured to receive the image data via column lines (e.g., paths 210 may be column lines). As further examples, the column readout circuitry may include column amplifiers for amplifying signals read out from pixel array 202, sample and hold circuitry for sampling and storing signals read out from pixel array 202, analog-to-digital converter circuits for converting read out analog signals to corresponding digital data, and column or frame memory for storing the read out signals and any other desired data. If desired, processing circuitry 208 may include processing circuitry for performing image processing functions that modify the received image signals such as data accumulation, data subtraction, noise filtering, adjusting white balance and exposure, implementing video image stabilization, etc.

If desired, system control circuitry for image sensor 112 may be coupled to array control circuitry 204 and/or processing circuitry 208. The system control circuitry may provide timing data, pixel addressing data (e.g., row addresses), configuration data, etc., to array control circuitry 204 and/or processing circuitry 208 to operate array control circuitry 204 in concert with processing circuitry 208 and other circuitry on image sensor 112. As an example, during image pixel readout operations, a pixel row in pixel array 202 may be selected using array control circuitry 204, and image data associated with image pixels of that pixel row may be read out by and received at processing circuitry 208.

As shown in FIG. 2, processing circuitry 208 may provide (processed) image data to data formatting circuitry 214 via paths 216, 224, and 236. Data formatting circuitry 214 may also receive image (frame) timing data from processing circuitry 208 via paths 218 and 228. Based on the received image data and image timing data, data formatting circuitry 214 may organize, format, encapsulate, or otherwise package the processed video image data for output from image sensor 112 via one or more output paths 238. One or more output paths 238 may form one or more paths 130 in FIG. 1. As an example, data formatting circuitry 214 may be an output framer configured to generate frames of image data in a suitable format and output image data in a series of frames via one or more paths 238 to host subsystem 120 (in FIG. 1).

In the some applications, it may be crucial for a host subsystem such as host subsystem 120 (in FIG. 1) to verify that image data (e.g., packaged as a series of image frames) received from an image sensor such as image sensor 112 (in FIG. 2) is genuine and unmolested before the image frames can be used by the host subsystem. As an example, the image sensor may calculate a Message Authentication Code (MAC) value for each image frame it generates and may append the calculated MAC value to the corresponding outgoing frame. The host subsystem may then verify that the video frame is genuine by also calculating the MAC value of the incoming frame and comparing the image sensor-calculated MAC value to the host subsystem-generated MAC value. If the two MAC values match, the host subsystem may determine that the frame is genuine and unmolested.

Cryptographic algorithms such as HMAC, GMAC or CMAC algorithms may be used to calculate the MAC value for each image frame. However, MAC calculations may be computationally-intensive for the host subsystem. In particular, in order to verify authenticity of the received image frame, the host subsystem is required to perform the same MAC calculations as those performed by the image sensor (and by any additional image sensors).

A given image sensor may support high frame rates (e.g., 30-60 frames per second) and a large number of pixels (e.g., 5, 8 or 12 mega-pixels). This may lead to very high data rates conveyed to the host subsystem. As a particular example, an image sensor having 8 mega-pixels and operating at 60 frames-per-seconds may have data rates of approximately 6 gigabits-per-second. Dedicated high-performance MAC hardware may therefore be required to support full-rate, full-frame video authentication of such an image sensor. However, many types of host subsystems may not have MAC generation circuitry capable of handling these data rates. Furthermore, these types of host subsystems may be required to process multiple streams of frames from multiple image sensors simultaneously, thereby further overloading the processing capacity of these types of host subsystems.

To mitigate these issues, a system (e.g., system 100) may provide a mechanism that allows a host system such as host subsystem 120 to control the per-frame MAC computational load to match the capabilities of processing circuitry on the host subsystem without reducing the authentication efficacy. If desired, the MAC computation load may also be varied in response to changes in processing load for the host subsystem over time. In particular, an imaging system such as imaging system 110 may include a data authentication subsystem to generate authentication data for image data from a subset of pixels in a configurable region-of-interest (ROI) for any given image frame. The system may also include associated circuitry in the imaging system and the host subsystem for securely configuring/reconfiguring the ROI (e.g., depending on the capabilities of the host subsystem). Illustrative details for these features are described herein.

Still referring to FIG. 2, image sensor 112 may include data authentication subsystem 240 (sometimes referred to herein as video or image data authentication subsystem). Data authentication system 240 may receive image data from tap point 220 (e.g., a data mirroring circuit or data splitting circuit) interposed along the image data path between processing circuitry 208 and data formatting circuitry 214. Data authentication system may receive the image data from tap point 220 via path 226. The image data on path 226 may be the same as the image data on path 224. Data authentication system 240 may also receive (frame) timing data from tap point 222 interposed between the timing data path between processing circuitry 208 and data formatting circuitry 214 (over path 230).

Image sensor 112 may include secure control and processing circuitry 242 configured to provide control and configuration signals to data authentication subsystem 240. As an example, secure control and processing circuitry 242 may handle secure communications to and from data authentication subsystem 240 and may therefore operate separately from the control and processing circuitry for the general image sensing system (e.g., circuitry 204, 208, control circuitry for controlling circuitry 204 and 208, etc.) to provide an additional layer of security.

Secure control and processing circuitry 242 may be coupled to storage or memory circuitry such as secure memory circuitry 246 and secure memory circuitry 250. As an example, memory circuitry 246 may be non-volatile memory (e.g., read-only memory) that stores firmware instructions and that provides the firmware instructions over path 248 to secure control and processing circuitry 242 for processing. As another example, memory circuitry 250 may be volatile memory (e.g., random access memory) that stores parameters and other information used during the processing operations of secure control and processing circuitry 242 and may convey these types of information between itself and processing circuitry 242 via path 252. Storage circuitry 246 and 250 may similarly be isolated from other storage or memory circuitry for supporting the general image sensing system to provide an additional layer of security (e.g., storage circuitry 246 and 250 may be dedicated for processing circuitry 242).

To enable secure external control (e.g., by host subsystem 110, by a system external to image sensor 112, etc.) for data authentication subsystem 240, image sensor 112 may include interface and memory circuitry 254 that receives and/or outputs data and control signals via one or more paths 258 (e.g., implemented as a part of one or more paths 132 in FIG. 1). Interface and memory circuitry 254 and secure control and processing circuitry 242 may be communicatively coupled via one or more paths 256 to convey the data and signals.

In particular, interface and memory circuitry 254 may include shared memory circuitry (e.g., memory circuitry accessible by both image sensor 112 and host subsystem 120). As an example, a host subsystem may supply parameters, and/or any other suitable data over one or more paths 258 to be received and/or stored at the shared memory circuitry. Image sensor 112 (e.g., secure control and processing circuitry 242) may therefore access and retrieve the supplied data and signals from the shared memory circuitry. Interface and memory circuitry 254 may also include interface circuitry (e.g., interface registers) configured to receive commands and other suitable control signals from host subsystem 120. These commands may be conveyed to secure control and processing circuitry 242 via one or more paths 256 (e.g., commands to retrieve data from the shared memory circuitry, commands to update the configuration of data authentication system 240). If desired, the interface circuitry may also convey signals to host subsystem 120 over one or more paths 258.

Data authentication subsystem 240 may generate authentication data (e.g., message authentication code (MAC), a MAC value) based on the image data received over path 226 and based on the timing data received over path 230. As an example, a MAC value may be generated for and may be associated with each image frame of data. The generated authentication data may be supplied over path 234 to injection point 232 (e.g., a data appending circuit or a data injection circuit).

More specifically, data authentication subsystem 240 may continually receive image data for a given (first) image frame (e.g., as indicated by the received timing data). Data authentication subsystem 240 may generate authentication data (e.g., the MAC value for the given image frame) based on the received image data for the given frame and output the authentication data over path 234 to be appended to the image data for the given image frame (e.g., at the end of the image frame data). Data authentication subsystem 240 may then receive the image data for a second frame (e.g., immediately subsequent to the first frame), generate the MAC value for the second frame, and output the MAC value over path 234 to be appended to the second frame. This may continue for any subsequent frames. In other words, data authentication subsystem 240 may operate (e.g., generate authentication data or MAC values) on a per-frame basis.

To more efficiently generate authentication data, data authentication subsystem 240 may generate the authentication data based on only a subset of the image data for a given image frame (e.g., image data defined by a region-of-interest within the given frame, image data defined by dispersed points within a region-of-interest within the given frame, etc.). Secure control and processing circuitry 242 may provide configuration data (e.g., parameters and other relevant data) that defines the subset of image data used to generate the authentication data to be supplied to injection point 232. The subset of the image data may be reconfigured as specified by secure control and processing circuitry 242 (e.g., by input control signals and input parameters received from host subsystem 120 over one or more paths 258).

Figure 3:
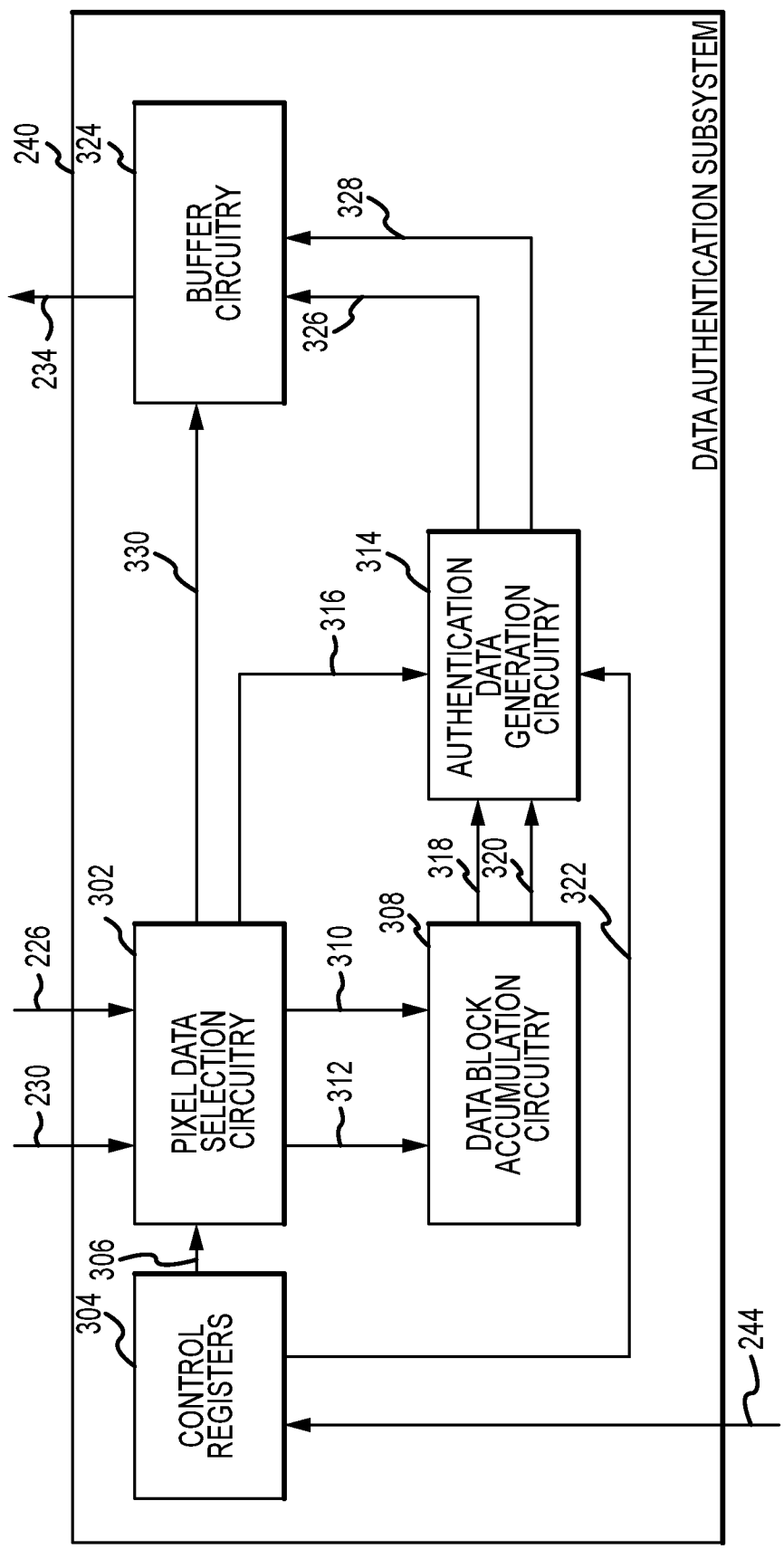
FIG. 3 is a diagram of an illustrative data authentication subsystem for authenticating a configurable subset of image data defined by a configurable sparse region-of-interest in an image sensor pixel array in accordance with some embodiments.

An illustrative arrangement for data authentication subsystem 240 of FIG. 2 is shown in FIG. 3. As shown in FIG. 3, data authentication subsystem 240 may include pixel data selection circuitry 302 that receives image data via one or more paths 226 and timing data over one or more paths 230. Pixel data selection circuitry 302 may pass a portion of the received data over respective paths 310 based on selection criteria defined by signals from control registers 304.

Control registers 304 may receive control signals and/or configuration data over one or more paths 244 (e.g., from processing circuitry 242 in FIG. 2). The received control signals and/or configuration data may update or store control values at one or more registers in control registers 304. In particular, processing circuitry 242 may process firmware instructions stored on storage circuitry 246 in FIG. 2 to configure control registers 304.

In one or more illustrative configurations, control registers 304 may include a first set of registers that store parameters defining an active or current pixel data selection setting (e.g., defining a current region-of-interest for a first pixel selection or authentication session) and a second set of registers that store parameters defining a subsequent or currently inactive pixel data selection (e.g., defining a subsequent region-of-interest for a second pixel selection or authentication session).

In other words, the first set of registers may store region-of-interest configuration parameters that are actively used by pixel data selection circuitry 302, whereas the second set of register may store region-of-interest configuration parameters that may be used by pixel data selection circuitry 302 following a switchover operation from the first set of registers (e.g., a reconfiguration operation for data authentication subsystem 240 defining an end of the first authentication session and the beginning of the second authentication session). To facilitate the switchover operation, control registers 304 may maintain frame values (e.g., maintain a frame counter) for each session indicative of when or for which frames, pixel data selection circuitry 302 should begin a subsequent session.

Additionally, the first and second sets of registers may store two corresponding authentication keys for the two different sessions. Control registers 304 may provide the authentication key for the currently active session to authentication data generation circuitry 314 over path 322. In particular, authentication data generation circuitry 314 (e.g., MAC generation circuitry or MAC engine) may use the authentication key for generating each of the MAC values for the given session. The authentication key may be established based on communication between image sensor 240 and the host subsystem, as an example.

The active set of registers in control registers 304 may supply parameters (e.g., control signals, image data selection signals, row values, column values, pixel values, etc.) over one or more paths 306 to pixel data selection circuitry 302. Based on the configuration data stored at the active set of registers in control registers 304, pixel data selection circuitry 302 may select the subset of received image data, which will be authenticated for the given frame (e.g., the subset of pixel values for the frame, from which the MAC value will be generated). As an example, pixel data selection circuitry 302 may include column and row counters that may be compared with selection information (e.g., row information, column information, and/or pixel information associated with a region-of-interest, sparsity information associated with a sparse region-of-interest, etc.) supplied by the active set of registers in control registers 304.

If desired, pixel data selection circuitry 302 may generate one or more flag or control signals (e.g., signals indicative of when and/or which image data is being supplied, etc.) over one or more paths 312 to accumulation circuitry 308.

Any image data selected for authentication by pixel data selection circuitry 302 may be passed to data block accumulation circuitry 308. Data block accumulation circuitry 308 may include storage circuitry (e.g., data buffer circuitry, row buffer circuitry, etc.) that stores or accumulates the data passed from pixel data selection circuitry 302 in a fixed block size (e.g., as blocks of data). Data block accumulation circuitry 308 may be configured to receive all of the subset of image data associated with a given image frame that meets the region-of-interest criteria set by control registers 304 (e.g., passed from pixel data selection circuitry 302). The subset of image data may be received separately as multiple blocks of data. Each block of data may serve as an input to authentication data generation circuitry 314. In other words, authentication data generation circuitry 314 such as a MAC engine may generate authentication data such as a corresponding MAC value directly based on each block of data from accumulation circuitry 308.

For each frame, authentication data generation circuitry 314 may receive multiple data blocks from accumulation circuitry 308 (via path 318) and an authentication session key from control registers 304 (via path 322). Based on each data block and the session key, authentication data generation circuitry 314 may generate authentication data (e.g., a MAC value for that data block and any previously received data blocks for the same frame). Authentication data generation circuitry 314 may have an input block size, and accumulation circuitry 308 may have a storage capacity equal to the input block size. If desired, accumulation circuitry 308 may have a storage capacity larger than the input block size. The input block size of authentication data generation circuitry 314 may be dependent on the type of cryptographic algorithm used.

As an example, authentication data generation circuitry 314 may employ the Cipher-based Message Authentication Code (CMAC) algorithm, which uses a 128-bit input block size. In this example, the selected image data for a given frame may be passed to data block accumulation circuitry 308 in 128-bit blocks. Each 128-bit block of image data may then be passed to authentication data generation circuitry 314 to generate the corresponding MAC value for the given frame.

As another example, authentication data generation circuitry 314 may employ the Hash-based Message Authentication (HMAC) Code with the 256-bit Secure Hash Algorithm (SHA-256), which uses a 512-bit input block size. In this example, the selected image data for a given frame may be passed to data block accumulation circuitry 308 in 512-bit blocks. Each 512-bit block of image data may then be passed to authentication data generation circuitry 314 to generate the corresponding MAC value for the given frame.

These examples are merely illustrative. If desired, any other suitable authentication algorithms may be used. If desired, the selected image data may be received in data blocks with the corresponding input block size.

Pixel data selection circuitry 302 may provide a control signal indicative of when the final image data for a given image frame has been selected and passed to data block accumulation circuitry 308. The control signal (e.g., control signal Finalize MAC) may be provided over path 216 to authentication data generation circuitry 314. In response, authentication data generation circuitry may perform a finalize procedure of the corresponding MAC algorithm (e.g., of the HMAC or CMAC algorithm) to generate the final MAC value for the image frame. If desired, data block accumulation circuitry 308 may generate one or more flag or control signals (e.g., signals indicative of when and/or which data blocks are being supplied, etc.) over one or more paths 320 to authentication data generation circuitry 314.

Authentication data generation circuitry 314 may provide the authentication data (e.g., the final MAC value for the image frame) to buffer circuitry 324 via path 326. If desired, authentication data generation circuitry 314 may generate one or more flag or control signals (e.g., signals indicative of when and/or which MAC values are being supplied, etc.) over one or more paths 328 to buffer circuitry 324.

Buffer circuitry 324 may store or hold the final MAC value until the image frame has been provided to data formatting circuitry 214 via path 236 (in FIG. 2). At this time or any other suitable time, pixel data selection circuitry 302 may assert a control signal supplied to buffer circuitry 324 over path 330. This control signal (e.g., control signal InjectMAC) may control buffer circuitry 324 to output the final MAC value over path 234 to injection point 232 (in FIG. 2). The final MAC value may thereby be included in the outgoing data from path 238 (e.g., to host subsystem 120). If desired, the final MAC value may be appended to the corresponding image frame data in any other suitable manner.

To verify the authenticity of the image frame from path 238 received at host subsystem 120, host subsystem 120 (FIG. 1) may also include corresponding authentication data generation circuitry (e.g., a MAC engine for generating the MAC value for the incoming data frame to be compared with the MAC value generated by and received from image sensor 112). Data authentication subsystem 240 (FIG. 3) may selectively generate the MAC value based only on a subset of pixel data for a given frame, thereby reducing the computational load compared to scenarios where pixel data from the entire frame is used. As such, computational load placed on the authentication data generation circuitry in host subsystem 120 to generate the corresponding MAC value based on the same subset of pixel data is similarly reduced.

Figure 4:
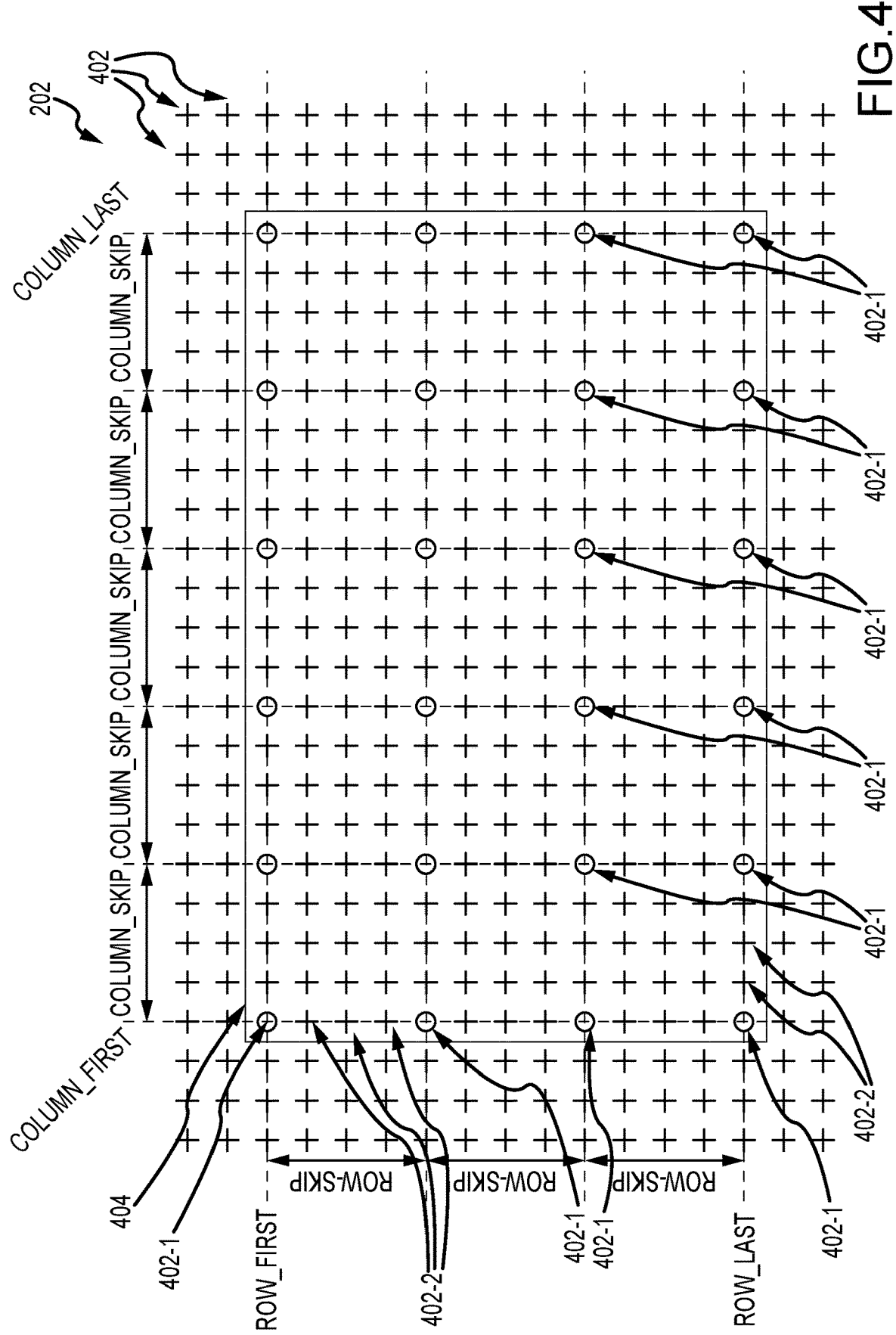
FIG. 4 is a diagram of an illustrative configurable sparse region-of-interest in an image sensor pixel array in accordance with some embodiments.

FIG. 4 is diagram of an illustrative image pixel array that may be implemented as image sensor pixel array 202 in FIG. 2. In particular, portions of pixel array 202 may be labeled by parameters used to define the subset of pixel data in an image frame (e.g., image data from pixels in a region-of-interest or from dispersed pixels in region-of-interest in pixel array 202). The subset of pixel data or pixel data from dispersed pixels in a region-of-interest may be used to generate authentication data.

As shown in FIG. 4, pixel array 202 may have a plurality of image sensor pixels 402 (i.e., denoted by all of the crosses and circles) arranged in columns and rows. Parameters COLUMN_FIRST, COLUMN_LAST, ROW_FIRST, and ROW_LAST may define region 404 (e.g., a rectangular region of pixels spanning between columns COLUMN_FIRST and COLUMN_LAST, inclusively, and spanning between rows ROW_FIRST and ROW_LAST, inclusively). Parameters COLUMN_SKIP and ROW_SKIP may further define the subset of pixels within region 404 whose image data are used to generate the authentication data.

In particular, region 404 may include pixels 402-1 (denoted by circles) and 402-2 (denoted by crosses within region 404). Only image data from pixels 402-1 (e.g., pixels denoted by circles, not pixels 402-2 and not pixels 402 outside of region 404) may be used to generate the authentication data. Parameter COLUMN_SKIP may define a number of columns between adjacent pixels 402-1 in any given row. Parameter ROW_SKIP may define a number of rows between adjacent pixels 402-2 in any given column. As such, pixels 402-1 may be an evenly-dispersed set of pixels in region 404 separated in the horizontal and vertical directions by corresponding numbers of pixels specified by parameters COLUMN_SKIP and ROW_SKIP.

The illustrative region 404 in FIG. 4 is merely an example. If desired, parameters COLUMN_FIRST, COLUMN_LAST, ROW_FIRST, and ROW_LAST may define any suitable region-of-interest (e.g., a square region). If desired, parameters COLUMN_SKIP and ROW_SKIP may define any suitable sparsity for pixels 402-1 within the suitable region-of-interest. Similarly, the parameters described in connection with FIG. 4 are merely illustrative. If desired, any other suitable types of parameters (e.g., parameters specifying individual pixels by an index, parameters specifying a region without sparsity, parameters specifying sparsity for an entire array, etc.) may be used.

As described in connection with FIGS. 1-3, host subsystem 120 (in FIG. 1) may convey these parameters via one or more paths 258 to image sensor 112 (in FIG. 2). These parameters may be ultimately conveyed to data authentication subsystem 240 (e.g., control registers 304 in FIG. 3) to control which image data for a given frame is passed to data block accumulation circuitry 308 from selection circuitry 302 and used to generate the authentication data (e.g., the MAC value). Host subsystem 120 may actively control these parameters to adjust the region-of-interest and pixel sparsity within the region-of-interest, thereby determining the number of pixels whose image data is being used to generate the MAC value. This may consequently determine the computation load required from host subsystem 120 to verify the MAC value (e.g., by generating the corresponding MAC value from the same set of pixels).

As an example, host subsystem 120 may adjust parameters defining the region-of-interest based on the importance of a portion of the full frame (e.g., the portion of the full frame containing or expected to contain an object of interest, a central portion of the frame, a portion of the frame due to the placement of the image sensor within a system, etc.). Host subsystem 120 may adjust pixel sparsity parameters (e.g., the SKIP parameters) to vary computational load. In particular, smaller values for the SKIP parameters provide more fine-grained coverage for the frame, resulting in improved tamper detection at the cost of a higher computational load. In contrast, larger values for the SKIP parameters reduce the computation load at the cost of reduced tamper detection. If desired, host subsystem 120 may regularly update region-of-interest parameters and/or pixel sparsity parameters to improve authentication coverage for the full frame. In such a manner, over a number of frames, image data from all of the pixels in the array may be authenticated.

It may be similarly important to prevent tampering of the transmission and reception of these parameters between host subsystem 120 and imaging system 110 (e.g., image sensor 112 in FIG. 1). In particular, secure control and processing circuitry 242 (in FIG. 2) may process firmware instructions stored on secure memory 246 to implement a secure 'command/response' protocol with a control channel session key. The session key may be negotiated during a session establishment procedure and may be used during the session to encrypt communications between host subsystem 120 and image sensor 112. Additionally, firmware instructions in image sensor 112 may support a command for updating ROI parameters.

Figure 5:
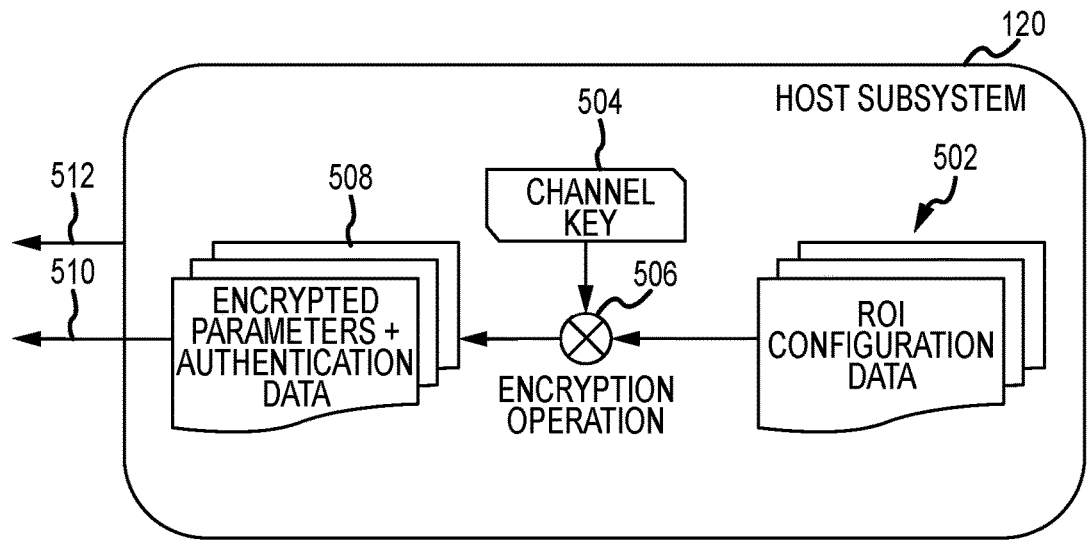
FIG. 5 is a diagram of an illustrative encryption process for region-of-interest configuration data at a host subsystem in accordance with some embodiments.
Figure 6:
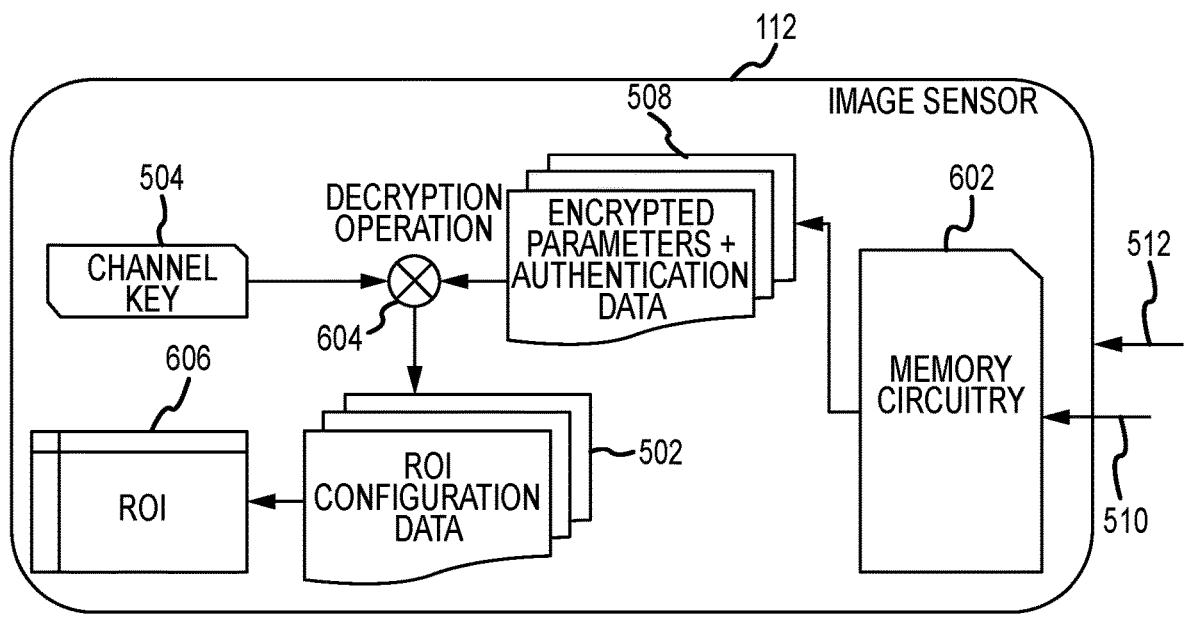
FIG. 6 is a diagram of an illustrative decryption process for encrypted region-of-interest configuration data at an imaging system in accordance with some embodiments.

FIGS. 5 and 6 are diagrams showing illustrative encryption and decryption processes that may be implemented by host subsystem 120 and image sensor 112 to securely transmit and receive the region-of-interest and (pixel) sparsity parameters. As shown in FIG. 5, host subsystem 120 (e.g., processing circuitry in host subsystem 120) may generate region-of-interest (ROI) configuration data 502 (e.g., parameters defining a region-of interest, sparsity of pixels whose data is used for authentication, a frame counter or frame identifier indicative of when or with which frames this set of configuration data should be used, etc.). Host subsystem 120 (e.g., an encryption engine, processing circuitry, etc.) may perform an encryption operation 506 to encrypt ROI configuration data 502 based on the shared control channel key 504. As an example, encryption circuitry on host subsystem 120 may use an authenticated encryption cryptographic algorithm such as AES-CCM (i.e., Advanced Encryption Standard-Counter with Cipher Block Chaining-Message Authentication Code). The use of an authenticated encryption cryptographic algorithm may enable image sensor 112 to confirm that the encrypted data was generated by host subsystem 120. The encryption operation 506 may thereby generate encrypted ROI parameters and authentication data for the encrypted parameters 508 (e.g., a MAC value for the encrypted parameters).

Host subsystem 120 may provide encrypted parameters and the authentication data 508 over one or more paths 510 (e.g., that form one or more paths of paths 132) to image sensor 112. Host subsystem 120 may also provide a command or flag signal over path 512 indicative of when ROI parameters are provided to image sensor 112 or when ROI parameters in data authentication subsystem (in FIG. 3) may be updated (e.g., by a 'UpdateROI' command).

As shown in FIG. 6, image sensor 112 may receive the encrypted parameters and corresponding authentication data over one or more paths 510 (from host subsystem 120) and may (subsequently or concurrently) receive a command signal for updating ROI parameters. In particular, the encrypted parameters may be received and stored at memory circuitry 602 (e.g., corresponding to the shared memory circuitry of interface and memory circuitry 254 in FIG. 2). Secure control and processing circuitry 242 (in FIG. 2) may receive the UpdateROI command, and in response, may retrieve encrypted parameters and authentication data 508 from memory circuitry 602.

Image sensor 112 may first authenticate the received ROI parameters before decrypting the ROI parameters. In particular, image sensor 112 may generate corresponding authentication data (e.g., a corresponding MAC value) to be compared with the received authentication data (e.g., the MAC value generated by host subsystem). After confirming the authenticity of the encrypted parameters, image sensor 112 (e.g., a decryption engine, processing circuitry, etc.) may perform decryption operation 604 using the shared control channel key 504 to extract ROI configuration data 502. The extracted ROI configuration data 502 may be used to update the ROI settings at data authentication subsystem 240. As an example, ROI configuration data 502 may be parsed to extract the parameters that are supplied to control registers 304 in FIG. 3 (e.g., to the currently inactive or subsequent set of registers in control registers 304).

A switchover operation from the active set of registers to the subsequent set of registers may take place based on the frame information received as part of the ROI parameters (e.g., also stored in control registers 304). As an example, timing data received at selection circuitry 302 (in FIG. 3) may include a frame counter, and selection circuitry 302 may compare the frame counter to the frame information stored at control registers 304 to determine when to perform the switchover operation (e.g., when the frame counter is equal to the frame stored at a frame counter register in registers 304).

If desired, host subsystem 120 may provide ROI parameters in the manner described in connection with FIGS. 1-6 at any suitable interval (e.g., at regular interval) or based on any suitable factors (e.g., to provide authentication coverage for all of the image pixels in the array over several frames, based on unused computational load for processing circuitry at host subsystem 120, based on the environmental factors of system 100, etc.) These examples, configurations, and processes for system 100 (e.g., for component systems 110 and 120 and their components) described in connection with FIGS. 1-6 are merely illustrative. If desired, any suitable modifications may be made.

Various embodiments have been described for illustrative systems and methods for efficiently authenticating image data.

As an example, an image sensor may include an image sensor pixel array having image sensor pixels configured to generate pixel signals; signal processing circuitry coupled to the image sensor pixel array and configured to receive the pixel signals and generate image data for an image frame based on the receive pixel signals; a data authentication subsystem coupled to the signal processing circuitry and configured to receive the image data; data formatting circuitry coupled to the processing circuitry via a signal path and configured to output the image data for the image frame secure control and processing circuitry coupled to that data authentication subsystem and configured to provide configuration data to the data authentication subsystem; secure memory circuitry coupled to the secure control and processing circuitry; and interface and memory circuitry coupled to the secure control and processing circuitry and configured to store external signals and pass the external signals to the secure control and processing circuitry. The data authentication subsystem may include pixel data selection circuitry configured to select a portion of the image data; authentication data generation circuitry configured to generate authentication data from the portion of the image data; a set of registers coupled to the pixel data selection circuitry, configured to store parameters based on which the pixel data selection circuitry selects the portion of the image data, and configured to supply the parameters to the pixel data selection circuitry; data block accumulation circuitry interposed between the pixel data selection circuitry and the authentication data generation circuitry, the data block accumulation circuitry configured to accumulate the portion of the image data as one or more data blocks, the authentication data generation circuitry configured to receive each of the one or more data blocks as a separate input block; and buffer circuitry coupled to the authentication data generation circuitry and configured to store the authentication data. The data authentication subsystem may be configured to receive the image data from a tap point along the signal path and configured to inject the authentication data at an injection point along the signal path As another example, an image sensor may include an image sensor pixel array; signal processing circuitry coupled to the image sensor pixel array and configured to generate image data for a given image frame based on image signals from the image sensor pixel array; and a data authentication subsystem coupled to the signal processing circuitry, configured to receive the image data, and configured to generate authentication data for the given image frame based on a portion of the image data, the portion of the image data corresponding to image signals generated by image sensor pixels within a region-of-interest of the image sensor pixel array. If desired, the portion of the image data corresponds to image signals generated by dispersed image sensor pixels within the region-of interest. If desired, the dispersed image sensor pixels may be disposed in non-consecutive rows and are disposed in non-consecutive columns relative to each other. The data authentication subsystem may include control registers configured to store parameters defining the region-of-interest; and data selection circuitry coupled to the control registers and configured to receive the image data and to selectively output the portion of the image data based on the stored parameters. If desired, the control registers may be configured to receive additional parameters defining pixel sparsity within the region-of-interest, and the pixel sparsity may at least partly determine the portion of the image data. If desired, the control registers may be configured to receive additional parameters defining an additional region-of-interest of the image senor pixel array, and the data authentication subsystem may be configured to receive image data for an additional image frame and configured to generate additional authentication data for the additional image frame based on a portion of the additional image data, the portion of the additional image data corresponding to image signals generated by image sensor pixels within the additional region-of-interest of the image sensor pixel array.

As yet another example, a system may include an image sensor configured to generate first image data for a first image frame and second image data for a second image frame; and a host subsystem coupled to the image sensor via an image data path and via a control path. The host subsystem may be configured to: provide parameters and signals specifying pixel data from a first set of pixels dispersed within an image sensor pixel array and specifying that a data authentication subsystem in the image sensor generate authentication data for the first image frame based on the parameters and signals, and provide additional parameters and signals specifying pixel data from a second set of pixels dispersed within the image sensor pixel array and specifying that the data authentication subsystem in the image sensor generate authentication data for the second image frame based on the additional parameters and signals. The data authentication subsystem may be configured to generate corresponding authentication data for a first set of additional image frames based on the parameters and signals and configured to generate corresponding authentication data for a second set of additional image frames based on the additional parameters and signals. The host subsystem may be configured to provide a set of additional parameters and signals specifying pixel data from corresponding sets of pixels dispersed within the image sensor pixel array, and first and second sets of pixels in combination with the corresponding sets of pixels may include all pixels in the image sensor pixel array. If desired, the first and second sets of pixels may be dispersed within a same region of the image sensor pixel array. If desired, a number of pixels in the first set of pixels may be smaller than a number of pixels in the second set of pixels.

The foregoing is merely illustrative of the principles of this invention and various modifications can be made by those skilled in the art. The foregoing embodiments may be implemented individually or in any combination.

What is claimed is:

1. An image sensor comprising:
an image sensor pixel array having image sensor pixels configured to generate pixel signals;
signal processing circuitry coupled to the image sensor pixel array and configured to receive the pixel signals and generate image data for an image frame based on the receive pixel signals; and
a data authentication subsystem coupled to the signal processing circuitry and configured to receive the image data, the data authentication subsystem comprising:
pixel data selection circuitry configured to select a portion of the image data; and
authentication data generation circuitry configured to generate authentication data from the portion of the image data.

2. The image sensor defined in claim 1, wherein the data authentication subsystem comprises a set of registers coupled to the pixel data selection circuitry, configured to store parameters based on which the pixel data selection circuitry selects the portion of the image data, and configured to supply the parameters to the pixel data selection circuitry.

3. The image sensor defined in claim 2, wherein the data authentication subsystem comprises data block accumulation circuitry interposed between the pixel data selection circuitry and the authentication data generation circuitry, the data block accumulation circuitry configured to accumulate the portion of the image data as one or more data blocks.

4. The image sensor defined in claim 3, wherein the authentication data generation circuitry is configured to receive each of the one or more data blocks as a separate input block.

5. The image sensor defined in claim 1, wherein the data authentication subsystem comprises buffer circuitry coupled to the authentication data generation circuitry and configured to store the authentication data.

6. The image sensor defined in claim 1 further comprising:
data formatting circuitry coupled to the processing circuitry via a signal path and configured to output the image data for the image frame.

7. The image sensor defined in claim 6, wherein the data authentication subsystem is configured to receive the image data from a tap point along the signal path and is configured to inject the authentication data at an injection point along the signal path.

8. The image sensor defined in claim 1 further comprising:
secure control and processing circuitry coupled to that data authentication subsystem and configured to provide configuration data to the data authentication subsystem; and
secure memory circuitry coupled to the secure control and processing circuitry.

9. The image sensor defined in claim 8 further comprising:
interface and memory circuitry coupled to the secure control and processing circuitry and configured to store external signals and pass the external signals to the secure control and processing circuitry.

10. An image sensor comprising:
an image sensor pixel array;
signal processing circuitry coupled to the image sensor pixel array and configured to generate image data for a given image frame based on image signals from the image sensor pixel array; and
a data authentication subsystem coupled to the signal processing circuitry, configured to receive the image data, and configured to generate authentication data for the given image frame based on a portion of the image data, the portion of the image data corresponding to image signals generated by image sensor pixels within a region-of-interest of the image sensor pixel array.

11. The image sensor defined in claim 10, wherein the portion of the image data corresponds to image signals generated by dispersed image sensor pixels within the region-of interest.

12. The image sensor defined in claim 11, wherein the dispersed image sensor pixels are disposed in non-consecutive rows and are disposed in non-consecutive columns relative to each other.

13. The image sensor defined in claim 10, wherein the data authentication subsystem comprises:
control registers configured to store parameters defining the region-of-interest; and
data selection circuitry coupled to the control registers and configured to receive the image data and to selectively output the portion of the image data based on the stored parameters.

14. The image sensor defined in claim 13, wherein the control registers are configured to receive additional parameters defining pixel sparsity within the region-of-interest and wherein the pixel sparsity at least partly determines the portion of the image data.

15. The image sensor defined in claim 13, wherein the control registers are configured to receive additional parameters defining an additional region-of-interest of the image senor pixel array, and wherein the data authentication subsystem is configured to receive image data for an additional image frame and configured to generate additional authentication data for the additional image frame based on a portion of the additional image data, the portion of the additional image data corresponding to image signals generated by image sensor pixels within the additional region-of-interest of the image sensor pixel array.

16. A system comprising:
an image sensor configured to generate first image data for a first image frame and second image data for a second image frame; and
a host subsystem coupled to the image sensor via an image data path and via a control path, wherein the host subsystem is configured to:
provide parameters and signals specifying pixel data from a first set of pixels dispersed within an image sensor pixel array and specifying that a data authentication subsystem in the image sensor generate authentication data for the first image frame based on the parameters and signals, and
provide additional parameters and signals specifying pixel data from a second set of pixels dispersed within the image sensor pixel array and specifying that the data authentication subsystem in the image sensor generate authentication data for the second image frame based on the additional parameters and signals.

17. The system defined in claim 16, wherein the data authentication subsystem is configured to generate corresponding authentication data for a first set of additional image frames based on the parameters and signals and is configured to generate corresponding authentication data for a second set of additional image frames based on the additional parameters and signals.

18. The system defined in claim 16, wherein the host subsystem is configured to provide a set of additional parameters and signals specifying pixel data from corresponding sets of pixels dispersed within the image sensor pixel array, and wherein first and second sets of pixels in combination with the corresponding sets of pixels includes all pixels in the image sensor pixel array.

19. The system defined in claim 16, wherein the first and second sets of pixels are dispersed within a same region of the image sensor pixel array.

20. The system defined in claim 16, wherein a number of pixels in the first set of pixels is smaller than a number of pixels in the second set of pixels.

* * * * *